(12) United States Patent
Obliger

(10) Patent No.: US 12,016,483 B2
(45) Date of Patent: Jun. 25, 2024

(54) BEVERAGE MACHINE WITH A PARTLY OPENING DISPENSING FACE

(71) Applicant: SOCIETE DES PRODUITS NESTLE S.A., Vevey (CH)

(72) Inventor: Nicolas Obliger, Franey (FR)

(73) Assignee: Societe des Produits Nestle S.A., Vevey (CH)

( * ) Notice: Subject to any disclaimer, the term of this patent is extended or adjusted under 35 U.S.C. 154(b) by 750 days.

(21) Appl. No.: 16/980,243

(22) PCT Filed: Mar. 13, 2019

(86) PCT No.: PCT/EP2019/056269
§ 371 (c)(1),
(2) Date: Sep. 11, 2020

(87) PCT Pub. No.: WO2019/175232
PCT Pub. Date: Sep. 19, 2019

(65) Prior Publication Data
US 2021/0030192 A1 Feb. 4, 2021

(30) Foreign Application Priority Data

Mar. 14, 2018 (EP) ..................................... 18161841
Dec. 20, 2018 (EP) ..................................... 18214451
(Continued)

(51) Int. Cl.
*A47J 31/36* (2006.01)
*A47J 31/06* (2006.01)
*A47J 31/40* (2006.01)

(52) U.S. Cl.
CPC ....... *A47J 31/3628* (2013.01); *A47J 31/0642* (2013.01); *A47J 31/0673* (2013.01);
(Continued)

(58) Field of Classification Search
CPC ................ A47J 31/0642; A47J 31/0668; A47J 31/0673; A47J 31/0678; A47J 31/3628; A47J 31/3695; A47J 31/407
See application file for complete search history.

(56) References Cited

U.S. PATENT DOCUMENTS 9,387,980 B2 7/2016 Dogan et al.
9,526,370 B2 12/2016 Suggi Liverani et al.
(Continued)

FOREIGN PATENT DOCUMENTS

CN 204015983 U 12/2014
EP 2335529 6/2011
(Continued)

*Primary Examiner* — Reginald Alexander
(74) *Attorney, Agent, or Firm* — K&L Gates LLP

(57) ABSTRACT

A machine (1) is provided for preparing a beverage from an ingredient supplied into such machine (1) within a capsule (100) that is provided with an outlet membrane (101). The machine has an extraction unit (2) that has an ingredient extraction seat (20) for receiving such capsule (100), an inlet arrangement (21) for guiding water into the seat (20) and a dispensing arrangement (22) for guiding beverage out of the seat (20). The dispensing arrangement (22) has a face (220) delimiting a downstream part of the seat (20) and having a membrane opening portion (221) associated with or bearing a plurality of raised elements (225) configured to form beverage outlet orifices in the outlet membrane (101). The downstream part of the seat (20) is provided with one or more flow-through holes (224) extending from the face (220), the flow-through hole(s) (224) being configured such
(Continued)

that beverage flowing from the seat (20) through the flow-through holes (224) is guided towards a beverage dispensing area (1'). The face (220) further has a non-opening portion (222, 222a, 222b, 222c) that is free of any upstream-projecting raised element and that is at least substantially flush with the membrane opening portion (221) so as to delimit the seat (20). The non-opening portion (222, 222a, 222b, 222c) is provided with one or more flow-through holes (226) extending from the face (220). Such flow-through hole(s) (226) is/are configured such that beverage flowing from the seat (20) through such flow-through holes (226) is guided towards the beverage dispensing area (1').

16 Claims, 4 Drawing Sheets

(30) Foreign Application Priority Data

| Dec. 20, 2018 | (EP) | 18214459 |
| Dec. 20, 2018 | (EP) | 18214470 |
| Dec. 20, 2018 | (EP) | 18214475 |
| Dec. 20, 2018 | (EP) | 18214480 |

(52) U.S. Cl.
CPC .......... *A47J 31/407* (2013.01); *A47J 31/3633* (2013.01); *A47J 31/3695* (2013.01)

(56) References Cited

U.S. PATENT DOCUMENTS

| 9,661,948 | B2 | 5/2017 | Mariller | |
| 10,561,266 | B2 | 2/2020 | Rijskamp et al. | |
| 2002/0148357 | A1* | 10/2002 | Lazaris | A47J 31/3633 99/302 R |
| 2009/0320693 | A1* | 12/2009 | Ozanne | A47J 31/0673 426/77 |
| 2012/0067223 | A1* | 3/2012 | Vuagniaux | B65D 85/8061 426/77 |
| 2013/0084376 | A1* | 4/2013 | Fischer | A47J 31/4403 99/295 |
| 2013/0269536 | A1 | 10/2013 | Gavillet et al. | |
| 2014/0127371 | A1* | 5/2014 | Fischer | A47J 31/407 426/431 |
| 2014/0314925 | A1 | 10/2014 | Kamerbeek et al. | |
| 2015/0044342 | A1* | 2/2015 | Sonderegger | A47J 31/3638 426/433 |
| 2017/0135516 | A1 | 5/2017 | Fantappie | |
| 2018/0049583 | A1 | 2/2018 | Agon et al. | |

FOREIGN PATENT DOCUMENTS

| KR | 101469228 | 12/2014 |
| WO | 2009013777 | 1/2009 |

\* cited by examiner

Fig. 4
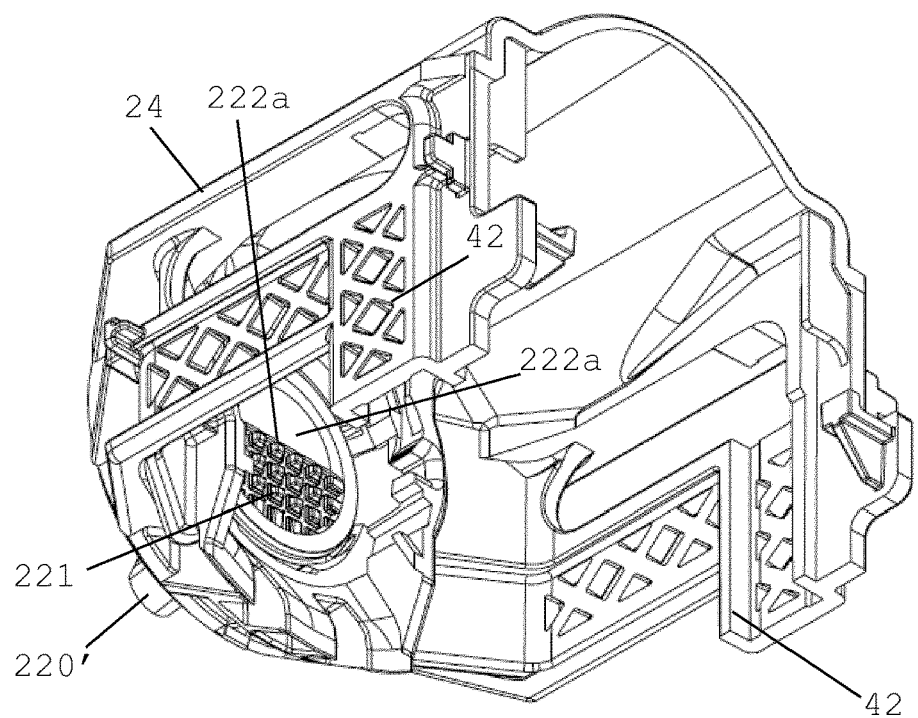
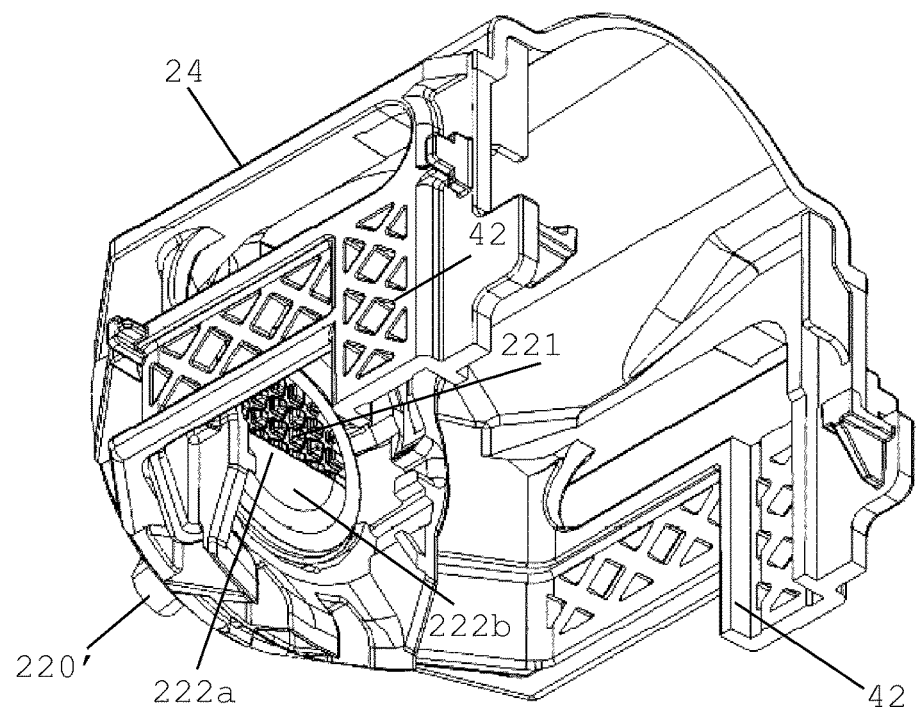
Fig. 5

BEVERAGE MACHINE WITH A PARTLY OPENING DISPENSING FACE

CROSS REFERENCE TO RELATED APPLICATIONS

The present application is a National Stage of International Application No. PCT/EP2019/056269, filed on Mar. 13, 2019, which claims priority to European Patent Application No. 18161841.4, filed on Mar. 14, 2018, European Patent Application No. 18214480.8, filed Dec. 20, 2018, European Patent Application No. 18214451.9, filed Dec. 20, 2018, European Patent Application No. 18214459.2, filed Dec. 20, 2018, European Patent Application No. 18214470.9, filed Dec. 20, 2018, and European Patent Application No. 18214475.8, filed Dec. 20, 2018, the entire contents of which are being incorporated herein by reference.

FIELD OF THE INVENTION

The field of the invention pertains to beverage preparation machines provided with a particular extraction arrangement, e.g. machines using capsules of an ingredient of the beverage to be prepared.

For the purpose of the present description, a "beverage" is meant to include any human-consumable liquid substance, such as tea, coffee, hot or cold chocolate, milk, soup, baby food, etc. A "capsule" is meant to include any pre-portioned beverage ingredient, such as a flavoring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

The preparation of beverage by extraction of an extractible ingredient, such as a brewable ingredient e.g. roast-and-ground coffee and/or tea, in particular contained in a portioned container such as a capsule, a pod or a sachet, is well known.

EP0512468 relates to a capsule with a cup-shaped body and a tearable beverage outlet membrane. The membrane is generally a thin aluminium membrane that tears against a tearing extraction plate of a beverage extracting device such as described in EP0512470.

EP0512470 relates to a system for extracting a coffee using a beverage extraction unit with a tearing extraction plate comprising multiple raised elements and channels in-between (called a "flow grille and relief surface element") which is adapted to receive a sealed capsule, to introduce water under pressure via a water injector into the capsule, to deform the outlet membrane or cover (e.g. an aluminium membrane) and to tear it under the effect of pressure of the liquid rising in the capsule to allow the beverage to be released from the capsule.

EP0602203 relates to a sealed flexible sachet in the form of an individual portion adapted to be extracted under pressure containing at least one powdered substance for the preparation of a beverage such as roast-and-ground coffee; the sachet comprising two identical flexible sheets of circular, oval or polygonal shape, which provide between one another a space for the substance and are sealed over their periphery so that the sachet is substantially symmetrical with respect to its plane of sealing, the sachet being opened under the effect of the increase in pressure in the sachet when the extraction fluid is injected.

EP0870457 relates to an extraction unit similar to as EP0512470, but adapted for a closed impermeable sachet containing coffee substance such as described in EP0602203. The device comprises an upper member comprising means intended to perforate the upper surface of the sachet and permit introduction of water into the sachet, a lower member which has a receptacle for accommodation of the capsule and raised and hollow portions; wherein the extraction surface of the sachet is drawn progressively and locally against the raised and hollow portions; the extraction surface tearing in multiple locations according to a path which is predetermined by the location of the raised and hollow portions and reaching its rupture tension there, in order to permit the flow of the liquid after extraction. The lower portion generally comprises flow apertures to permit the beverage to flow there-through. The raised and hollow portions are preferably under the form of truncated pyramids separated by a network of channels.

Hence, handy prior art beverage extraction systems utilize an exchangeable capsule, e.g. rigid capsule, sachet or flexible pod, comprising a tearable beverage outlet membrane, e.g. a thin aluminium foil, which can be torn only when a sufficient deformation of this membrane has occurred against the raised elements of the tearing plate. The tearing generally occurs at the edges of the raised elements which are generally multiple small truncated pyramids or rectilinear ridges. The tearing results in the creation of small orifices along the edges of these raised elements. These orifices are relatively small (e.g. 0.1-1.0 mm long and 0.1-0.3 mm wide) and generally the outlet membrane at least partially conforms to the top and upper side of the raised elements so reducing even more the flow opening area. As a result, the pressure drop is relatively high at this interface. Furthermore, filtering of the coffee particle occurs at this confined interface which is an advantage since no additional filter is necessary inside the capsule. This geometry of extraction therefore corresponds to what can be generally called a geometry of an extraction plate with raised elements in the present application. The flow of beverage is then collected in the channels and drained through small openings of well-defined dimensions in the channels.

In the known system of the prior art, the flow rate and pressure are dictated by the intrinsic properties of the capsule and by the performance of the pump.

The backpressure highly depends on the degree of compaction of the ground coffee in the capsule. For a same coffee blend, the variability of pressure can be very high. In particular, for certain coffee blends, in particular, in the low particle size, the pressure may vary from 5 to 15 bar.

Whereas the ingredient extraction space, e.g. with a capsule and/or an extraction chamber is usually symmetrical along the general flow direction, enabling easy handling of the ingredient, it may be advantageous to obtain a different flow path at extraction that is such as to obtain or increase certain extraction effects, e.g. creama formation or intensity of the extraction.

SUMMARY OF THE INVENTION

The invention relates to a machine for preparing a beverage. The beverage preparation machine can be an in-home or out of home machine. The machine may be for the preparation of coffee, tea, chocolate, cacao, milk, soup, baby food, etc.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluent liquid, e.g. water, may be mixed with such ingredient to form the beverage.

Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. In particular, a coffee machine may be configured for dispensing espressos, e.g. an adjustable volume of 20 to 60 ml per portion, and/or for dispensing lungos, e.g. a volume in the range of 70 to 150 ml per portion.

The invention relates to a machine for preparing a beverage from an ingredient supplied into such machine within a capsule that is provided with an outlet membrane.

The capsule can be of the type described above under the title "Field of the Invention" and/or the capsule may include an ingredient described under the same title.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

Self-opening capsules are for instance disclosed in CH 605 293 and WO 03/059778.

The opening of capsules by a machine's piercing elements of a plate is for example disclosed in EP 512 470 and EP 2 068 684.

Examples of suitable mixing units with mixing chambers are disclosed in WO 2008/037642 and WO 2013/026843.

The machine includes an extraction unit that has an ingredient extraction seat for receiving such capsule.

Examples of ingredient extraction seats, e.g. extraction chambers, are disclosed in EP 1767129, WO 2012/025258, WO 2012/025259, WO 2013/127476, WO 2014/056641, WO 2014/096122, WO 2014/096123, WO 2015/155144 and WO 2015/155145.

The machine has an inlet arrangement for guiding water into the seat and a dispensing arrangement for guiding beverage out of the seat.

The dispensing arrangement has a face delimiting a downstream part of the seat and having a membrane opening portion associated with or bearing a plurality of raised elements that are configured to project upstream and that are configured to form beverage outlet orifices in the outlet membrane.

The dispensing arrangement may have a wall, such as a plate-like or sheet-like member, forming the face. The raised elements may be fixed to or formed integrally with the plate or the raised elements may extend through the wall.

The downstream part of the seat is provided with one or more flow-through holes extending from the face, such as from bottom ends of the raised elements at the face. The flow-through hole(s) is/are configured such that beverage flowing from the seat through the flow-through hole(s) is guided towards a beverage dispensing area.

The machine may have a drop stop arrangement between the seat and the beverage dispensing area. Examples of drop stops are disclosed in WO 2006/050769, WO 2012/072758, WO 2013/127907, WO 2016/050657, WO 2016/083488, WO 2018/069266 and EP2017208722.3.

The dispensing area may be delimited by a support for supporting a user-recipient, e.g. a cup or mug. For instance, the support is a support device that is connected to an outside machine housing and/or a machine frame, or the support device is external to such machine, for example the machine itself is placed on the external support device for dispensing the beverage. Typically, the external support device has a generally horizontal surface for placing such machine, the device being for instance a table or a shelf.

The user-recipient support can be: associated with a drip tray e.g. a drip tray supporting the support; and/or movable relative to the housing vertically under the outlet and/or away from under a dispensing outlet for enabling a placement of user-recipients of different heights under the outlet.

Examples of suitable recipient supports are disclosed in EP 0 549 887, EP 1 440 639, EP 1 731 065, EP 1 867 260, US 5,161,455, US 5,353,692, WO 2009/074557, WO 2009/074559, WO 2009/135869, WO 2011/154492, WO 2012/007313, WO 2013/186339, EP 2014198710, EP 2014198712 and EP 2014198715.

The face further has a non-opening portion that is free of any upstream-projecting raised element forming an outlet in the membrane and that is at least substantially flush with the membrane opening portion, such as flush or in a plane substantially parallel to the membrane opening portion and off-set thereto by up to 5 mm e.g. up to 3 or 2 mm or up to about a tip of any of the raised elements, so as to delimit the seat. The non-opening portion is provided with one or more flow-through holes extending from the face, such flow-through hole(s) being configured such that beverage flowing from the seat through such flow-through holes is guided towards the beverage dispensing area. For example, such flow-through holes are configured to guide beverage draining out of beverage outlet orifices that are formed in the outlet membrane of the capsule prior to being received in the seat and/or that are formed by the raised elements.

By providing a face delimiting a downstream part of the seat that is non-homogeneous over its surface in terms of opening capability of the capsule's membrane, the flow in the capsule can be influenced to achieve desired flow paths, e.g. essentially concentrating the passage of water through the ingredient in the capsule (e.g. to obtain a concentrated beverage e.g. for obtaining a ristretto or an espresso coffee) or allowing the water to partly bypass the ingredient (typically by causing part of the water to flow above the ingredient) in the capsule (e.g. to obtain a diluted beverage e.g. a lungo or an Americano coffee). The sought effect may be increased or reduced or altered or complemented by the way the face's flow-through holes are arranged.

The face may have a surface area ratio of the opening portion over the non-opening portion in the range of 0.2 to 5, such as 0.33 to 3, for instance 0.5 to 2, e.g. 0.8 to 1.25.

The non-opening portion may have a first flow-through ratio of a total surface area of flow-through holes over a total surface area of an impervious portion of the non-opening portion delimiting such flow-through holes.

The opening portion may have a second flow-through ratio of a total surface area of flow-through holes extending from the opening portion over a total surface area of an impervious portion of the opening portion delimiting such flow-through holes.

The opening and non-opening portions can have a ratio of the first flow-through ratio over the second flow-through ratio that is different to 1, such as greater than 3 or smaller than 0.3, for instance greater than 8 or smaller than 0.125, e.g. greater than 20 or smaller than 0.05.

At least one of the opening portion and the non-opening portion may have a plurality of flow-through holes that form: a regular or irregular arrangement of spaced apart holes; and/or holes of substantially identical or of substantially different shapes and/or sizes; and/or holes having each a minimum diameter transverse to a beverage outflow direction along the hole, in the range of about 0.1 to 1 mm, such as 0.3 to 0.8 mm, e.g. 0.4 to 0.6 mm.

The opening portion and/or the non-opening portion can be provided with a number of flow-through holes (extending from the face) selected from:

1 to 40, such as 3 to 30, for instance 5 to 25, for example 7 to 20, e.g. 10 to 15, flow-through holes in the opening portion; and/or 1 to 20, such as 2 to 15, for instance 3 to 10, for example 4 to 8, e.g. 5 to 7, flow-through holes in the non-opening portion.

The face may include a physical or notional delimitation line, such as curved or angular or substantially straight and/or horizontal line, that divides the face into the opening portion and the non-opening portion. For instance, the face has a total height over a bottom of the face, the delimitation line being substantially horizontal and located at a level at a distance from the bottom that is in the range of 15% to 85% of the total height, such as 30% to 70% of the total height, e.g. 40% to 60% of the total height.

The opening portion and the non-opening portion can have a fixed position relative to the extraction seat or can be able to take different positions and/or orientations relative to the extraction seat so as to control a flow path of water through the ingredient when in the seat depending on the position and/or orientation of the opening and non-opening portions.

The plurality of raised elements can be stationary relative to the membrane opening portion or movable between:

a retracted inoperative position in which the raised elements are prevented from forming the beverage outlet orifices in the outlet membrane; and a deployed operative position in which the raised elements are in position to form beverage outlet orifices in the outlet membrane.

The plurality of raised elements can be configured to form beverage outlet orifices in the outlet membrane:

before supplying water into the seat via the inlet arrangement, e.g. the orifices being provided in the outlet membrane at insertion of the capsule into the seat; and/or by pressure rise in the capsule caused by supplying water, e.g. at a supply pressure in the range of 5 to 20 bar such as 8 to 15 bar, so as to urge the outlet membrane against the plurality of raised elements.

The seat may be configured such that no beverage outlet orifice is made in the outlet membrane by the non-opening portion, whereby:

the outlet membrane is maintained impervious at the non-opening portion during beverage preparation in the seat; or the outlet membrane is provided with beverage outlet orifices prior to housing the capsule in the extraction seat, e.g. when the capsule is manufactured or subsequently conditioned e.g. in such machine prior to reaching the seat; or the outlet membrane is provided with beverage outlet orifices that are formed by tearing and/or breaking the membrane by pressure rise in the capsule by supply of water into the capsule, for instance to open pre-weakened parts of the membrane and/or actuate a membrane opening element comprised inside the capsule. The face may have a at least approximately disc shape.

At least one of the opening and non-opening portions may form:

a circular or annular sector, e.g. generally half disc, such as a circular or annular sector having a circle centre that is at least approximately concentric with the face's circular shape, optionally the circular or annular sector extending to a circular edge of the face's circular shape, for instance the circular or annular sector having a central angle in the range of 60 to 300°, such as 90 to 270°, for example 120 to 240°, e.g. 150 to 210°; or a disc segment, optionally the disc segment having a disc centre that is at least approximately concentric with the face's shape.

The extraction seat can be delimited by a first part and a second part, such as a first part bearing the face and a second part bearing the inlet arrangement, that are relatively movable between: an open position for inserting the capsule into the extraction seat and/or for removing such capsule from the seat; and a closed position for extracting in the seat the ingredient in the capsule.

At least one part of the first and second parts may delimit a cavity for receiving the capsule, such as a tapered cavity, e.g. a conical or pyramidal cavity, or a straight cavity, e.g. a cylindrical or trapezoidal cavity. Such cavity may extend along an axis that is generally collinear with the above longitudinal straight axis.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

For example, the first and second parts are relatively movable by an actuator such as by a user-handle or by an electric motor, e.g. an actuator connected to at least one of the first and second parts by a transmission such as one or more of gears, belts, cams and cam-followers, levers and/or hydraulic transmissions. For instance the electric motor is controlled by a control unit for controlling the water supply arrangement, such as a unit including a processing device e.g. a controller and/or a user interface.

Examples of motors implemented to actuate such first and second parts are disclosed in EP 1767129, WO 2012/025258, WO 2012/025259, WO 2013/127476, WO 2014/056641, WO 2014/096122, WO 2014/096123, WO 2015/155144 and WO 2015/155145.

One of the first and second parts can be stationary relative to an outside machine housing and the other of the first and second parts can be movable relative to the outside machine housing.

Examples of suitable first and second part arrangements are disclosed in WO 2005/004683, WO2007/135136, WO 2009/043630, WO 2017/037212, WO 2017/037215, PCT/EP18/064138 and PCT/EP18/064141.

The inlet arrangement may be fluidically connected to a water supply arrangement via a water guide.

The water supply arrangement may include at least one of: a water source for supplying water to the inlet arrangement, such as a water tank and/or a connector to an external water supply line; a water driver for driving water to the inlet arrangement, such as a pump; and a thermal conditioner, e.g. a heater and/or a cooler, for thermally conditioning water supplied or to be supplied to the inlet arrangement, such as a water flow thermal conditioner or a water accumulator thermal conditioner.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The water supply arrangement may be associated with a or the above control unit for controlling the water supply arrangement, such as a unit having a processing device e.g. a controller and/or a user interface.

The inlet arrangement may be associated with a piercing or cutting arrangement configured to pierce or cut water inlet opening(s) into the ingredient capsule in the ingredient extraction seat so that water circulating along the inlet arrangement is passed into the capsule via the water inlet opening.

The seat can be associated with an un-extracted capsule insertion passage, e.g. extending from outside such machine, and/or an extracted ingredient evacuation passage, e.g. towards an extracted capsule collector. At least one of the passages may be associated with guides such as rails or grooves, for cooperating with and guiding said capsule along the passage to and/or from the seat and/or with a stop for immobilizing the capsule at about a level of the seat.

Examples of extracted capsule collectors are disclosed in EP 1867260, WO 2009/074559, WO 2009/135869, WO 2010/128109, WO 2011/086087, WO 2011/086088, WO 2017/118713, WO 2017/148965 and EP 2018156589.

The insertion passage, when present, may be associated with a capsule barrier, such as a gate or door or hatch, for selectively allowing and preventing such capsule from passing along the passage. Details of suitable barriers for such capsule, are disclosed in WO 2012/126971, WO 2014/056641, WO 2014/056642 and WO 2015/086371.

The interaction between the first and second parts (and optionally the transfer channel) and the capsule may be of the type disclosed in WO 2005/004683, WO 2007/135135, W02007/135136, WO 2008/037642 and WO 2013/026856.

When present, the control unit may have a control circuit, e.g. a control circuit for controlling a or the above liquid driver and/or a or the above thermal conditioner. The control circuit may include a micro-controller and/or a microprocessor.

The control unit can comprise a capsule sensor. Details of suitable capsule sensors are disclosed in WO 2012/123440, WO 2014/147128, WO 2015/173285, WO 2015/173289, WO 2015/173292, WO 2016/005352, WO 2016/005417, PCT/EP18/065613, EP3275345 and EP3275346.

The control unit may incorporate a user-interface, such as a user-interface connected to a or the above control circuit. The user-interface may be of the known type, e.g. as disclosed in WO 2010/037806, WO 2011/020779, WO 2016/083485, WO 2017/037215 and PCT/EP18/064138.

The control unit can have a sensor for sensing a presence of a user-recipient, e.g. a cup or mug, in a or the above area to which beverage from the beverage processing line is dispensed. Such a configuration is for instance disclosed in WO 2018/046400.

The invention also relates to a combination of a machine as described above and the above described capsule. For instance, the capsule is received in the extraction seat.

The invention also relates to a use of an ingredient capsule for extraction in a machine as described above.

The pressure is typically measured downstream a pump and upstream the water inlet, e.g. in the fluid line between the water inlet and the pump. The pressure in the extraction chamber or in the capsule may possibly be reduced compared to such measured pressure by the presence of a check valve, e.g. at the water inlet of the injection part, and/or restrictions provided in the water inlet of the injection part or by piercing members engaged in the entry wall of the capsule and/or by the ingredient in the capsule and/or other obstacles.

BRIEF DESCRIPTION OF THE DRAWINGS

The invention will now be described with reference to the schematic drawings, wherein:

FIGS. 4 to 6 illustrate variations according to the invention of extraction unit downstream parts.

DETAILED DESCRIPTION

Figure 1:
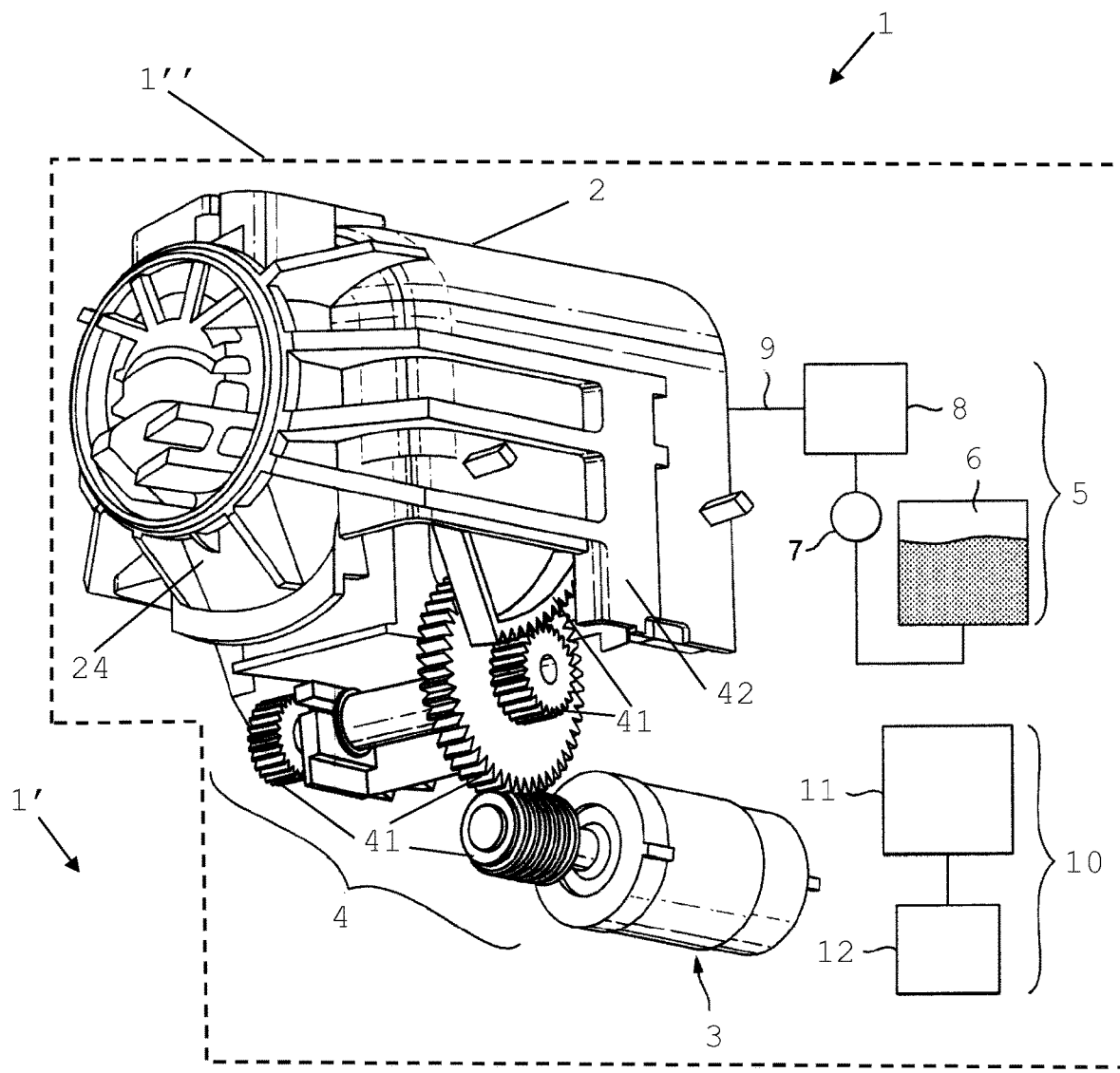
FIG. 1 shows an example of part of a beverage machine according to the invention, part of which being schematically illustrated.
Figure 2:
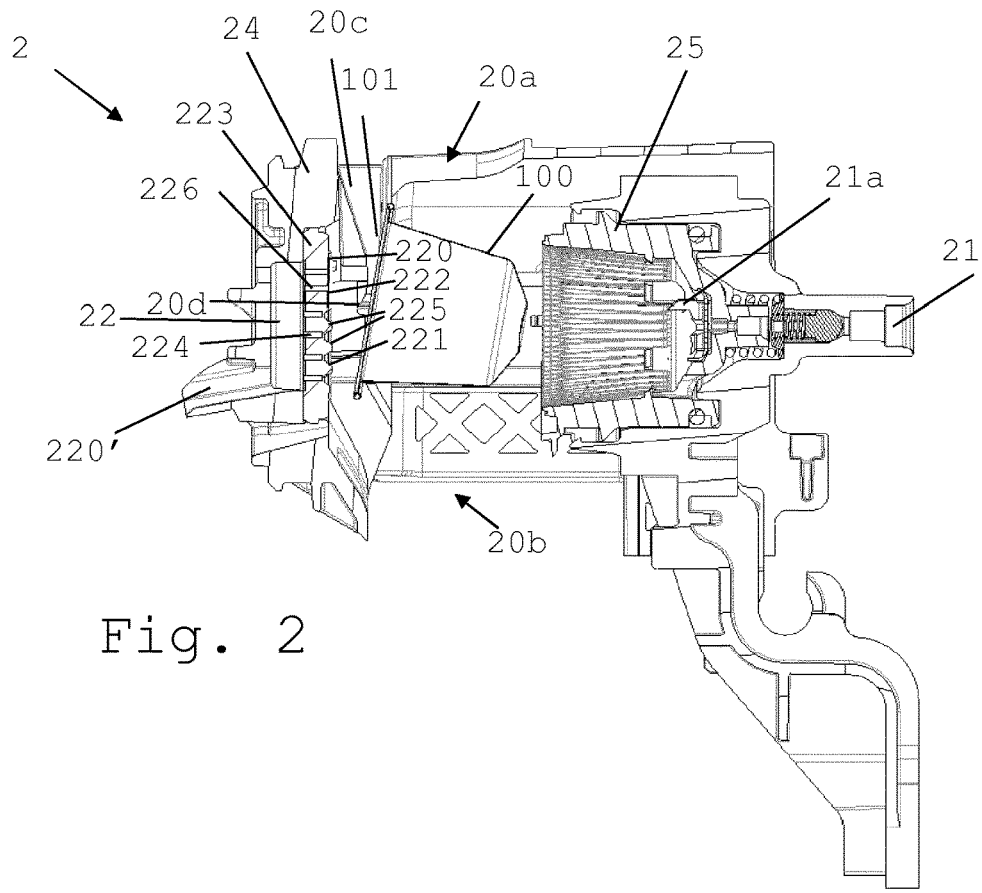
FIG. 2 is a cross-sectional view of an extraction unit of the machine of FIG. 1, an ingredient capsule being in the process of being introduced into the unit's seat.
Figure 3:
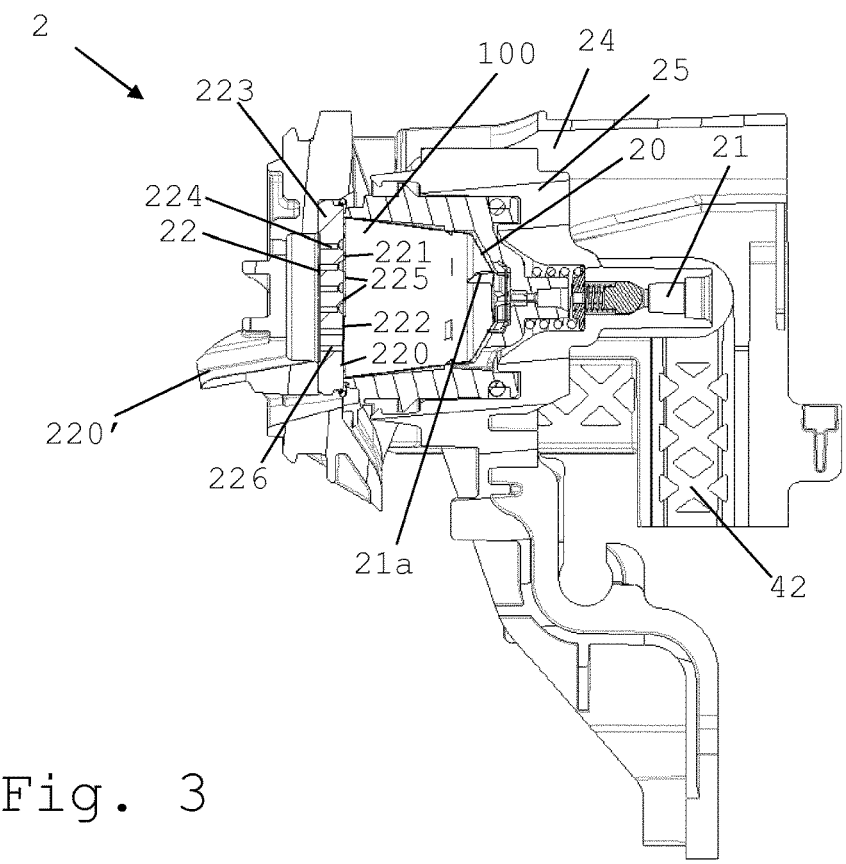
FIG. 3 is a cross-section view of the extraction unit of FIG. 2, the ingredient capsule being housed in the seat, ready for extraction.
Figure 6:
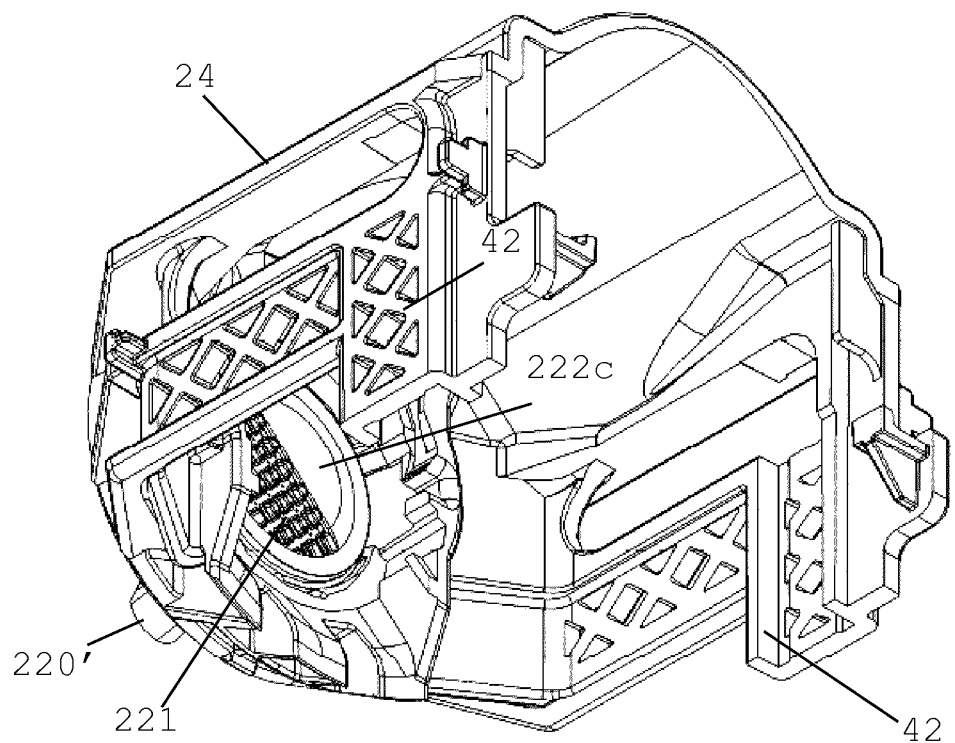
Figure 7:
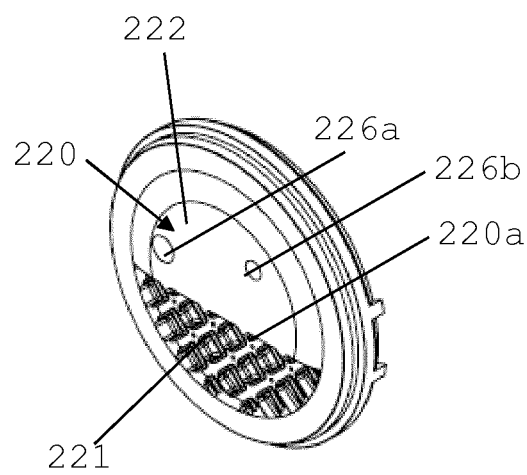
FIGS. 7 and 8 illustrate each an example of a face delimiting the seat's downstream part that can be implemented in the embodiment shown in FIGS. 1 to 6.
Figure 8:
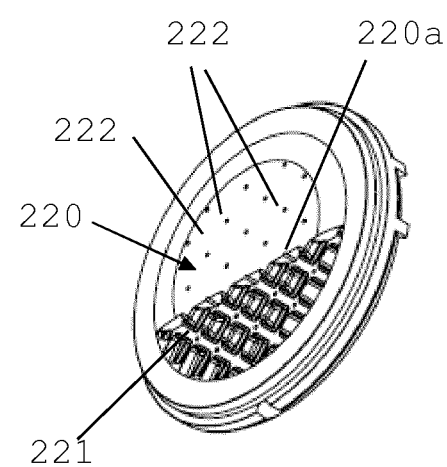

FIGS. 1 to 8 illustrate an exemplary machine according to the invention with variations.

Machine 1 is configured for preparing a beverage from an ingredient supplied into such machine 1 within a capsule 100 that is provided with an outlet membrane 101. Machine 1 includes an extraction unit 2 that has an ingredient extraction seat 20 for receiving such capsule 100, an inlet arrangement 21 for guiding water into seat 20 and a dispensing arrangement 22 for guiding beverage out of seat 20. Dispensing arrangement 22 has a face 220 delimiting a downstream part of seat 20. Face 220 has a membrane opening portion 221 associated with or bearing a plurality of raised elements 225 that are configured to project upstream and that are configured to form beverage outlet orifices in outlet membrane 101. The downstream part of seat 20 is provided with one or more flow-through holes 224 extending from face 220, such as from bottom ends of raised elements 225 at face 220. Flow-through hole(s) 224 is/are configured such that beverage flowing from seat 20 through flow-through holes 224 is guided towards a beverage dispensing area 1'.

Dispensing arrangement 22 may have a wall 223, such as a plate-like or sheet-like member 223, forming face 220.

Face 220 further has a non-opening portion 222,222a, 222b,222c that is free of any upstream-projecting raised element forming an outlet in membrane 101 and that is at least substantially flush with membrane opening portion 221, such as flush or in a plane substantially parallel to membrane opening portion 221 and off-set thereto by up to 5 mm e.g. up to 3 or 2 mm or up to about a tip of any of raised elements 225, so as to delimit seat 20. Non-opening portion 222,222a,222b,222c is provided with one or more flow-through holes 226 extending from face 220. Such flow-through hole(s) 226 is/are configured such that beverage flowing from seat 20 through such flow-through holes 226 is guided towards beverage dispensing area 1'.

Flow-through holes 226 may be configured to guide beverage draining out of beverage outlet orifices that are formed in outlet membrane 101 of capsule prior to being received in seat 20.

Face 220 can have a surface area ratio of opening portion 221 over non-opening portion 222,222a,222b,222c in the range of 0.2 to 5, such as 0.33 to 3, for instance 0.5 to 2, e.g. 0.8 to 1.25.

Non-opening portion 222,222a,222b,222c can have a first flow-through ratio of a total surface area of flow-through holes 226 over a total surface area of an impervious portion of the non-opening portion 222,222a, 222b,222c delimiting such flow-through holes 226.

Opening portion 221 can have a second flow-through ratio of a total surface area of flow-through holes 224 extending from opening portion 221 over a total surface area of an impervious portion of opening portion 221 delimiting such flow-through holes 224.

Opening and non-opening portions 221,222,222a,222b, 222c can have a ratio of the first flow-through ratio over the second flow-through ratio that is different to 1, such as greater than 3 or smaller than 0.3, for instance greater than 8 or smaller than 0.125, e.g. greater than 20 or smaller than 0.05.

At least one of opening portion 221 and non-opening portion 222,222a,222b,222c may include a plurality of flow-through holes 224,226 that form:

a regular or irregular arrangement of spaced apart holes; and/or holes of substantially identical or of substantially different shapes and/or sizes; and/or holes having each a minimum diameter transverse to a beverage outflow direction along the hole, in the range of about 0.1 to 1 mm, such as 0.3 to 0.8 mm, e.g. 0.4 to 0.6 mm.

Opening portion 221 and/or the non-opening portion 222,222a,222b,222c may be provided with a number of flow-through holes 224,226 extending from face 220, selected from: 1 to 40, such as 3 to 30, for instance 5 to 25, for example 7 to 20, e.g. 10 to 15, flow-through holes 224 in opening portion 221; and/or 1 to 20, such as 2 to 15, for instance 3 to 10, for example 4 to 8, e.g. 5 to 7, flow-through holes 226 in non-opening portion 222,222a,222b,222c.

Face 220 may include a physical or notional delimitation line 220a, such as a curved or angular or substantially straight and/or horizontal line 220a, that divides face 220 into opening portion 221 and non-opening portion 222,222a, 222b,222c. For instance, face 220 has a total height over a bottom of face 220, delimitation line 220a being substantially horizontal and located at a level at a distance from the bottom that is in the range of 15% to 85% of the total height, such as 30% to 70% of the total height, e.g. 40% to 60% of the total height.

Opening portion 221 and non-opening portion 222,222a, 222b,222c may have a fixed position relative to extraction seat 20 or may be able to take different positions and/or orientations relative to extraction seat so as to control a flow path of water through the ingredient when in seat 20 depending on the position and/or orientation of opening and non-opening portions 221, 222,222a,222b,222c.

The plurality of raised elements 225 can be stationary relative to membrane opening portion 221 or movable between: a retracted inoperative position in which raised elements 225 are prevented from forming the beverage outlet orifices in outlet membrane 101; and a deployed operative position in which raised elements 225 are in position to form beverage outlet orifices in outlet membrane 101.

The plurality of raised elements 225 can be configured to form beverage outlet orifices in outlet membrane 101:

before supplying water into seat 20 via inlet arrangement 21, e.g. the orifices being provided in the outlet membrane at insertion of the capsule into the seat; and/or by pressure rise in capsule 100 caused by supplying water, e.g. at a supply pressure in the range of 5 to 20 bar such as 8 to 15 bar, so as to urge outlet membrane 101 against the plurality of raised elements 225.

Seat 20 may be configured such that no beverage outlet orifice is made in outlet membrane 101 by non-opening portion 222,222a,222b,222c, whereby:

outlet membrane 101 is maintained impervious at non-opening portion 222,222a,222b,222c during beverage preparation in seat 20; or outlet membrane 101 is provided with beverage outlet orifices prior to housing the capsule in the extraction seat, e.g. when the capsule is manufactured or subsequently conditioned e.g. in such machine 1 prior to reaching seat 20; or outlet membrane 101 is provided with beverage outlet orifices that are formed by tearing and/or breaking membrane 101 by pressure rise in capsule 100 by supply of water into capsule 100, for instance to open pre-weakened parts of membrane 101 and/or actuate a membrane opening element comprised inside capsule 100.

Face 220 can have a at least approximately disc shape.

At least one of opening and non-opening portions 221, 222,222a,222b,222c may form:

a circular or annular sector, e.g. generally half disc 222a,222b,222c, such as a circular or annular sector having a circle centre that is at least approximately concentric with the face's circular shape, optionally the circular or annular sector extending to a circular edge of the face's circular shape, for instance the circular or annular sector having a central angle in the range of 60 to 300°, such as 90 to 270°, for example 120 to 240°, e.g. 150 to 210°; or a disc segment 222a,222b,222c, optionally the disc segment having a disc centre that is at least approximately concentric with the face's shape.

Extraction seat 20 may be delimited by a first part 24 and a second part 25, such as a first part 24 bearing face 220 and a second part 25 bearing inlet arrangement 21, that are relatively movable between: an open position for inserting capsule 100 into extraction seat 20 and/or for removing such capsule 100 from seat 20; and a closed position for extracting in seat 20 the ingredient in capsule 100.

First and second parts 24,25 can be relatively movable by an actuator such as by a user-handle or by an electric motor 3, e.g. an actuator connected to at least one of first and second parts 24,25 by a transmission 4 such as one or more of gears 41, belts, cams 42 and cam-followers, levers and/or hydraulic transmissions. For instance electric motor 3 is controlled by a control unit 10 for controlling water supply arrangement 5, such as a unit 10 having a processing device e.g. a controller 11 and/or a user interface 12.

One of first and second parts 24,25 may be stationary relative to an outside machine housing 1" and the other of first and second parts 24,25 may be movable relative to outside machine housing 1".

Inlet arrangement 21 may be fluidically connected to a water supply arrangement 5 via a water guide 9.

Water supply arrangement 5 may include at least one of: a water source 6 for supplying water to inlet arrangement 21, such as a water tank and/or a connector to an external water supply line; a water driver 7 for driving water to inlet arrangement 21, such as a pump; and a thermal conditioner 8, e.g. a heater and/or a cooler, for thermally conditioning water supplied or to be supplied to inlet arrangement 21, such as a water flow thermal conditioner or a water accumulator thermal conditioner.

Water supply arrangement 5 can be associated with a or the above control unit 10 for controlling water supply arrangement 5, such as a unit 10 having a processing device e.g. a controller 11 and/or a user interface 12.

Inlet arrangement 21 may be associated with a piercing or cutting arrangement 21a configured to pierce or cut water inlet opening(s) into ingredient capsule 100 in ingredient extraction seat 20 so that water circulating along inlet arrangement 21 is passed into capsule 100 via the water inlet opening.

Seat 20 may be associated with an un-extracted capsule insertion passage 20a, e.g. extending from outside such machine 100, and/or an extracted ingredient evacuation passage 20b, e.g. towards an extracted capsule collector. For instance, at least one of passages 20a,20b is associated with guides 20c such as rails or grooves, for cooperating with and guiding capsule 100 along the passage to and/or from seat 20 and/or with a stop 20d for immobilizing capsule 100 at about a level of seat 20.

The invention claimed is:

1. A machine for preparing a beverage from an ingredient supplied into the machine within a capsule that is provided with an outlet membrane, the machine comprising an extraction unit that has an ingredient extraction seat for receiving the capsule, the extraction unit further comprising an inlet arrangement for guiding water into the ingredient extraction seat and a dispensing arrangement for guiding the beverage out of the ingredient extraction seat, the dispensing arrangement comprising a face delimiting a downstream part of the ingredient extraction seat and having a membrane opening portion comprising a plurality of raised elements that are configured to project upstream and that are configured to form beverage outlet orifices in the outlet membrane, the downstream part of the ingredient extraction seat being provided with a first set of one or more flow-through holes extending from the face, the first set of one or more flow-through holes being configured such that the beverage flowing from the ingredient extraction seat through the first set of one or more flow-through holes is guided towards a beverage dispensing area, the face further has a non-opening portion that is free of any upstream-projecting raised element forming an outlet in the outlet membrane and that is at least substantially flush with the membrane opening portion, so as to delimit the ingredient extraction seat, the non-opening portion being provided with a second set of one or more flow-through holes extending from the face, the second set of one or more flow-through holes being configured such that the beverage flowing from the ingredient extraction seat through the second set of one or more flow-through holes is guided towards the beverage dispensing area, wherein the face comprises a physical or notional delimitation line that divides the face into the membrane opening portion and the non-opening portion, the physical or notional delimitation line being substantially horizontal and located at a level at a distance from a bottom of the face that is in a range of 15% to 85% of a total height of the face.

2. The machine of claim 1, wherein:

the non-opening portion has a first flow-through ratio of a total surface area of the second set of flow-through holes over a total surface area of an impervious portion of the non-opening portion delimiting the second set of flow-through holes;

the opening portion has a second flow-through ratio of a total surface area of the first set of flow-through holes extending from the opening portion over a total surface area of an impervious portion of the opening portion delimiting the first set of flow-through holes; and the opening and non-opening portions have a ratio of the first flow-through ratio over the second flow-through ratio that is different to 1.

3. The machine of claim 1, wherein at least one of the first set of flow-through holes and the second set of flow-through holes form:

a regular or irregular arrangement of spaced apart holes; and/or holes of substantially identical or of substantially different shapes and/or sizes; and/or holes having each a minimum diameter transverse to a beverage outflow direction along the hole, in the range of about 0.1 to 1 mm.

4. The machine of claim 1, wherein the opening portion and/or the non-opening portion are provided with:

1 to 40 flow-through holes in the first set of flow-through holes; and/or 1 to 20 flow-through holes in the second set of flow-through holes.

5. The machine of claim 1, wherein the opening portion and the non-opening portion have a fixed position relative to the ingredient extraction seat or are able to take different positions and/or orientations relative to the ingredient extraction seat so as to control a flow path of water through the ingredient when in the ingredient extraction seat depending on the position and/or orientation of the opening and non-opening portions.

6. The machine of claim 1, wherein the plurality of raised elements are:

A) stationary relative to the membrane opening portion or movable between: a retracted inoperative position in which the plurality of raised elements are prevented from forming the beverage outlet orifices in the outlet membrane; and a deployed operative position in which the plurality of raised elements are in position to form the beverage outlet orifices in the outlet membrane; and/or B) configured to form the beverage outlet orifices in the outlet membrane:

before supplying water into the ingredient extraction seat via the inlet arrangement; and/or by pressure rise in the capsule caused by supplying water, so as to urge the outlet membrane against the plurality of raised elements.

7. The machine of claim 1, wherein the ingredient extraction seat is configured such that no beverage outlet orifice is made in the outlet membrane by the non-opening portion, whereby:

the outlet membrane is maintained impervious at the non-opening portion during beverage preparation in the ingredient extraction seat; or the outlet membrane is provided with the beverage outlet orifices prior to housing the capsule in the ingredient extraction seat; or the outlet membrane is provided with the beverage outlet orifices that are formed by tearing and/or breaking the outlet membrane by pressure rise in the capsule by supply of water into the capsule.

8. The machine of claim 1, wherein the face has an at least approximately disc shape.

9. The machine of claim 1, wherein the extraction seat is delimited by a first part and a second part, that are relatively movable between:
    an open position for inserting the capsule into the ingredient extraction seat and/or for removing the capsule from the ingredient extraction seat; and
    a closed position for extracting in the ingredient extraction seat the ingredient in the capsule.

10. The machine of claim 1, wherein the inlet arrangement is fluidically connected to a water supply arrangement via a water guide.

11. The machine of claim 1, wherein the inlet arrangement is associated with a piercing or cutting arrangement configured to pierce or cut one or more water inlet openings into the ingredient capsule in the ingredient extraction seat so that water circulating along the inlet arrangement is passed into the capsule via the one or more water inlet openings.

12. The machine of claim 1, wherein the ingredient extraction seat is associated with an un-extracted capsule insertion passage.

13. The machine of claim 1, wherein the non-opening portion is flush or in a plane substantially parallel to the membrane opening portion and off-set thereto by up to 5 mm to about a tip of any of the raised elements.

14. A combination of a machine for preparing a beverage from an ingredient supplied into the machine within a capsule that is provided with an outlet membrane and the capsule, the machine comprising an extraction unit that has an ingredient extraction seat for receiving the capsule, the extraction unit further comprising an inlet arrangement for guiding water into the ingredient extraction seat and a dispensing arrangement for guiding the beverage out of the ingredient extraction seat, the dispensing arrangement comprising a face delimiting a downstream part of the ingredient extraction seat and having a membrane opening portion comprising a plurality of raised elements that are configured to project upstream and that are configured to form beverage outlet orifices in the outlet membrane,
    the downstream part of the ingredient extraction seat being provided with a first set of one or more flow-through holes extending from the face, the first set of one or more flow-through holes being configured such that beverage flowing from the ingredient extraction seat through the first set of one or more flow-through holes is guided towards a beverage dispensing area,
    the face further has a non-opening portion that is free of any upstream-projecting raised element forming an outlet in the outlet membrane and that is at least substantially flush with the membrane opening portion, so as to delimit the seat, the non-opening portion being provided with a second set of one or more flow-through holes extending from the face, the second set of one or more flow-through holes being configured such that the beverage flowing from the ingredient extraction seat through the second set of one or more flow-through holes is guided towards the beverage dispensing area, and wherein the capsule is received in the ingredient extraction seat,
    wherein the face comprises a physical or notional delimitation line that divides the face into the membrane opening portion and the non-opening portion, the physical or notional delimitation line being substantially horizontal and located at a level at a distance from a bottom of the face that is in a range of 15% to 85% of a total height of the face.

15. The machine of claim 14, wherein the non-opening portion is flush or in a plane substantially parallel to the membrane opening portion and off-set thereto by up to 5 mm to about a tip of any of the raised elements.

16. A method for extraction of an ingredient from an ingredient capsule using a machine, wherein the machine comprises an extraction unit that has an ingredient extraction seat for receiving the ingredient capsule, the extraction unit further comprising an inlet arrangement for guiding water into the ingredient extraction seat and a dispensing arrangement for guiding a beverage out of the ingredient extraction seat, the dispensing arrangement comprising a face delimiting a downstream part of the ingredient extraction seat and having a membrane opening portion comprising a plurality of raised elements that are configured to project upstream and that are configured to form beverage outlet orifices in the outlet membrane,
    the downstream part of the ingredient extraction seat being provided with a first set of one or more flow-through holes extending from the face, the first set of one or more flow-through holes being configured such that the beverage flowing from the ingredient extraction seat through the first set of one or more flow-through holes is guided towards a beverage dispensing area,
    the face further has a non-opening portion that is free of any upstream-projecting raised element forming an outlet in the outlet membrane and that is at least substantially flush with the membrane opening portion, so as to delimit the ingredient extraction seat, the non-opening portion being provided with a second set of one or more flow-through holes extending from the face, the second set of one or more flow-through holes being configured such that the beverage flowing from the ingredient extraction seat through the second set of one or more flow-through holes is guided towards the beverage dispensing area,
    wherein the face comprises a physical or notional delimitation line that divides the face into the membrane opening portion and the non-opening portion, the physical or notional delimitation line being substantially horizontal and located at a level at a distance from a bottom of the face that is in a range of 15% to 85% of a total height of the face,
    the method comprising guiding the beverage flowing from the ingredient extraction seat through the first and second set of flow-through holes toward the beverage dispensing area.

* * * * *